Nov. 27, 1923.
C. V. THOMPSON
BLACKBOARD ERASER CLEANER
Filed Jan. 9, 1922
1,475,523
2 Sheets-Sheet 1
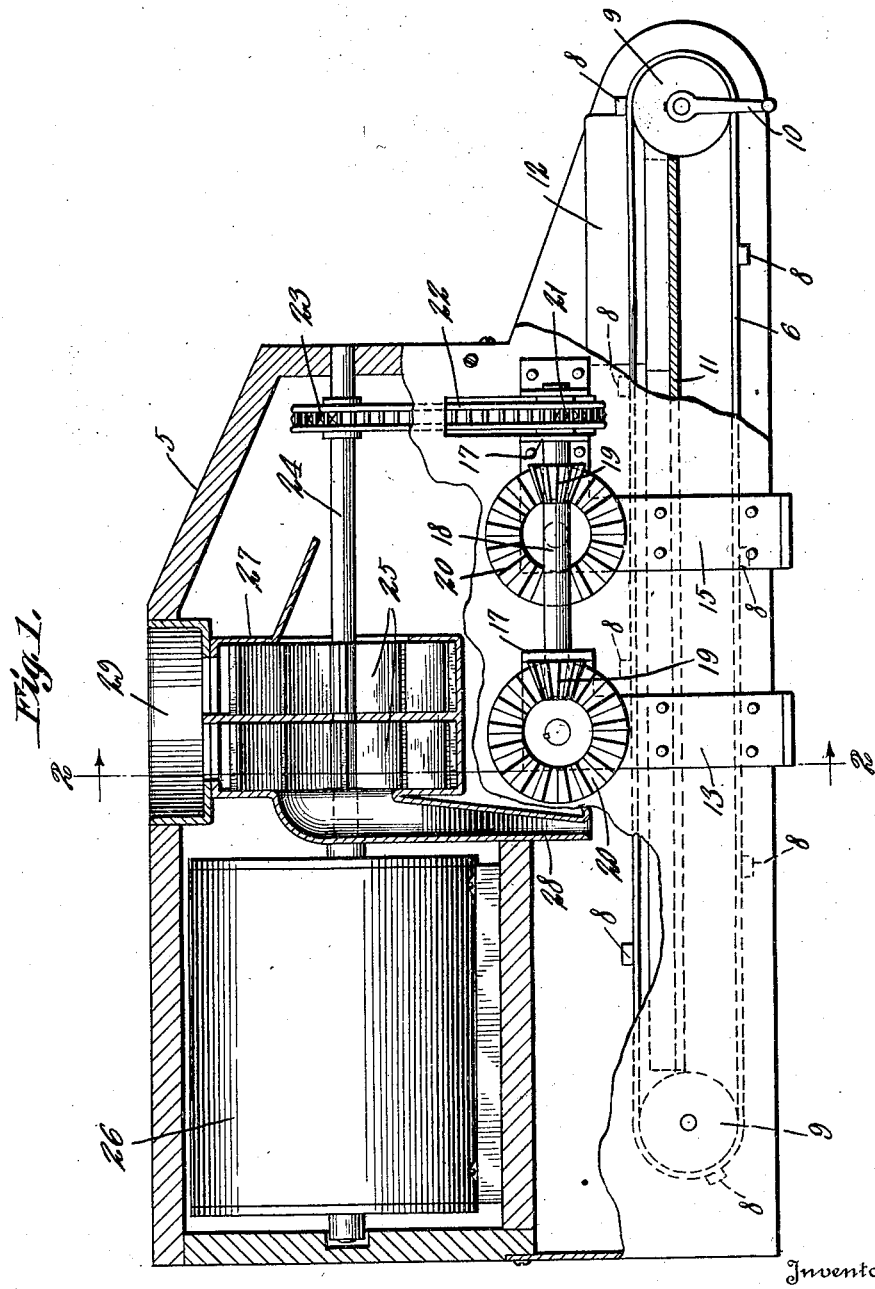

Nov. 27, 1923.　　　　　　　　　　　　　　　1,475,523
C. V. THOMPSON
BLACKBOARD ERASER CLEANER
Filed Jan. 9, 1922　　　　　2 Sheets-Sheet 2
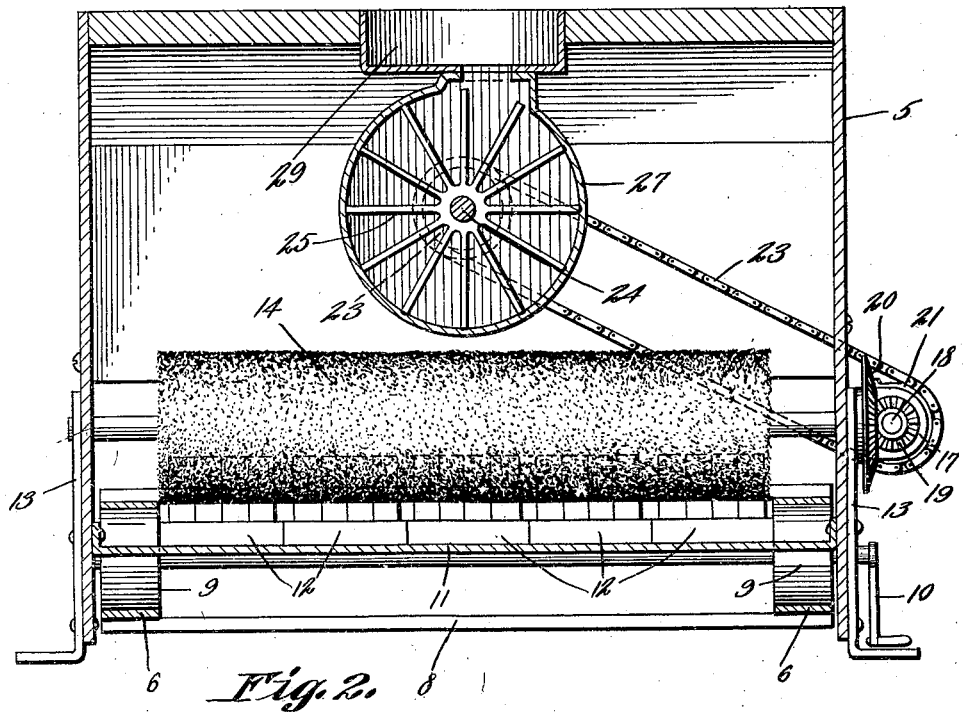
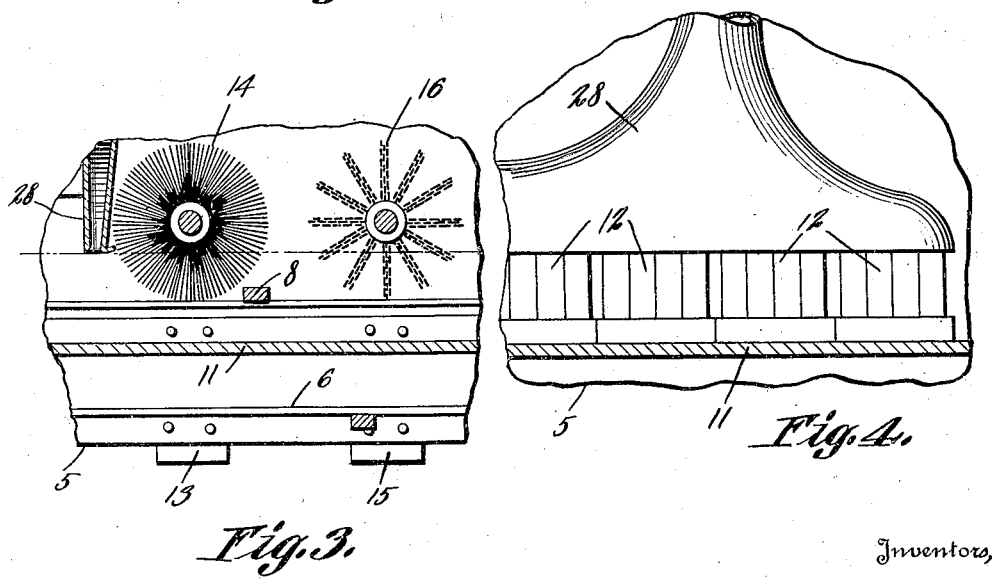
Inventor,
C. V. Thompson.
By C. A. Snow & Co.
Attorneys.

Patented Nov. 27, 1923.

1,475,523

UNITED STATES PATENT OFFICE.

CORLISS VERNON THOMPSON, OF CARLTON, MINNESOTA.

BLACKBOARD-ERASER CLEANER.

Application filed January 9, 1922. Serial No. 528,111.

*To all whom it may concern:*

Be it known that I, CORLISS VERNON THOMPSON, a citizen of the United States, residing at Carlton, in the county of Carlton and State of Minnesota, have invented a new and useful Blackboard-Eraser Cleaner, of which the following is a specification.

This invention relates to blackboard eraser cleaners, the primary object of the invention being to provide a machine which will efficiently remove the dust from blackboard erasers while the erasers are being moved through the machine.

Another object of the invention is to provide means for creating a suction through the machine, to carry off the dust created during the cleaning operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a machine constructed in accordance with the present invention, one side wall being partly broken away to illustrate the interior of the machine.

Figure 2 is a sectional view taken on line 2—2 of Figure 1.

Figure 3 is a sectional view through a portion of the machine and disclosing the brush and rotary beater.

Figure 4 is an enlarged fragmental view of the vacuum nozzle and disclosing erasers passing thereunder.

Referring to the drawings in detail, the body portion of the machine is indicated generally by the reference character 5, in which is positioned the endless conveyor 6, disposed at the base of the machine.

The endless conveyor embodies a pair of belts operating in parallel relation with each other, and spaced apart to permit blackboard erasers to be positioned therebetween. Bars 8 connect the belts to provide abutments to contact with the erasers and move the same through the machine.

Rollers indicated at 9 are positioned within the body portion of the machine, and provide supports for the belts of the endless conveyor, one of the rollers being provided with a handle 10 by means of which the endless conveyor may be moved through the machine. Disposed between the upper and lower sections of the endless conveyor is a support 11 over which move the erasers which are indicated at 12.

Secured to the side walls of the machine are supports 13 which are formed with openings providing bearings for the brush 14, which brush is of a diameter to cause the same to contact with the felts, forming parts of the erasers. Disposed adjacent to the supports 13, are the supports 15 which provide bearings for the beater which is in the form of chains 16, the chains being secured to a suitable hub so that when the hub is rotated, the centrifugal force of the hub will throw the chains 16 outwardly, into direct contact with the felts of the eraser to dislodge the particles of dust therefrom. Each of these supports is formed with a right angled bearing member indicated at 17 in which operates the shaft 18 that carries pinions 19, the pinions 19 meshing with the beveled gears 20 mounted on the ends of the brush shaft, and beater shaft. At one end of the shaft 18 is a sprocket wheel 21 over which moves the chain 22 that also moves over the sprocket 23, carried on the shaft 24 to move the same.

The shaft 24 is the main or operating shaft of the machine and supports the fan member 25, the shaft forming a part of the motor 26 and extends from one end of the machine to the other. A housing 27 houses the fan member 25, which creates a suction through the housing to draw air through the nozzle 28 to remove the dust from the erasers and interior of the machine. Exhaust openings 29 are formed in the upper portion of the machine and communicate with the fan housing, so that the dust may pass outwardly from the housing.

In the operation of the same, the erasers to be cleaned, are positioned on the support 11 and the operating handle 10 is moved to operate the endless conveyors which carry the erasers forward. The motor 26 is rotated to cause the beater to engage the felts of the erasers to loosen the dust therefrom, whereupon the erasers pass to the brush which removes the dust from the erasers. The vacuum created in the nozzle 28 sucks the dust from between the layers of felt forming the rubbing surface of the erasers, and forces the dust from the machine.

The erasers after being cleaned drop through an opening formed at the rear end of the support 11, and falls into a receptacle placed directly under the opening to receive the erasers.

Having thus described the invention, what is claimed as new is:—

1. A blackboard eraser cleaner comprising a body portion, a support within the body portion, an endless conveyor comprising a pair of belts operating within the body portion, said belts being disposed in spaced relation with each other to receive erasers therebetween, means for operating the endless conveyor, and rotary means within the path of travel of the erasers over the support for removing foreign matter from the erasers.

2. A blackboard eraser cleaner comprising a body portion, a support within the body portion, an endless conveyor operating over the support and adapted to move erasers over the support, a rotary brush operating within the body portion, a rotary beater operating within the body portion, said brush and beater adapted to engage the erasers on their passage through the body portion, to dislodge foreign matter therefrom, and means for creating a vacuum within the body portion, to draw the foreign matter from the body portion.

3. In a device of the character described, a body portion, a support within the body portion, an endless conveyor including a pair of belts, bars for connecting the belts, said bars adapted to engage erasers positioned on the support for moving the same through the body portion, means for dislodging foreign matter from the erasers, and means for creating a suction through the body portion.

In testimony that I claim the foregoing as my own, I have hereto affixed my signature in the presence of two witnesses.

CORLISS VERNON THOMPSON.

Witnesses:
   CLIFFORD B. JONES,
   L. J. WILSON.